United States Patent
Nehmadi et al.

(10) Patent No.: US 11,226,413 B2
(45) Date of Patent: *Jan. 18, 2022

(54) APPARATUS FOR ACQUIRING 3-DIMENSIONAL MAPS OF A SCENE

(71) Applicant: VayaVision Sensing Ltd., Nili (IL)

(72) Inventors: Youval Nehmadi, Nili (IL); Shmuel Ur, Nili (IL); Ronny Cohen, Nili (IL)

(73) Assignee: VayaVision Sensing Ltd., Or Yehuda (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,284

(22) Filed: Nov. 30, 2020

(65) Prior Publication Data

US 2021/0080575 A1 Mar. 18, 2021

Related U.S. Application Data

(63) Continuation of application No. 15/087,186, filed on Mar. 31, 2016.

(Continued)

(51) Int. Cl.
*G01S 17/86* (2020.01)
*G01S 17/931* (2020.01)
(Continued)

(52) U.S. Cl.
CPC .............. *G01S 17/08* (2013.01); *B60R 11/04* (2013.01); *G01C 3/08* (2013.01); *G01C 21/3602* (2013.01);
(Continued)

(58) Field of Classification Search
CPC ........ G01S 17/08; G01S 17/931; G01S 17/86; G01S 17/42; G01S 17/89; G01C 3/08;
(Continued)

(56) References Cited

U.S. PATENT DOCUMENTS

| | | |
|---|---|---|
| 5,128,874 A | 7/1992 | Bhanu et al. |
| 5,195,144 A | 3/1993 | Parquier et al. |
| | (Continued) | |

FOREIGN PATENT DOCUMENTS

| | | | |
|---|---|---|---|
| CN | 104828664 B | * 5/2020 | ............... G06T 7/11 |
| DE | 10361869 | 7/2005 | |
| | (Continued) | | |

OTHER PUBLICATIONS

EP Search Report in EP Appln. No. 16774190.9, dated Jan. 28, 2019.

(Continued)

*Primary Examiner* — Albert Kir (74) *Attorney, Agent, or Firm* — Fish & Richardson P.C.

(57) ABSTRACT

An active sensor for performing active measurements of a scene is presented. The active sensor includes at least one transmitter configured to emit light pulses toward at least one target object in the scene, wherein the at least one target object is recognized in an image acquired by a passive sensor; at least one receiver configured to detect light pulses reflected from the at least one target object; a controller configured to control an energy level, a direction, and a timing of each light pulse emitted by the transmitter, wherein the controller is further configured to control at least the direction for detecting each of the reflected light pulses; and a distance measurement circuit configured to measure a distance to each of the at least one target object based on the emitted light pulses and the detected light pulses.

32 Claims, 7 Drawing Sheets

Related U.S. Application Data (60) Provisional application No. 62/160,988, filed on May 13, 2015, provisional application No. 62/141,296, filed on Apr. 1, 2015.

(51) Int. Cl.
| | |
|---|---|
| *G01S 17/93* | (2020.01) |
| *B60R 11/04* | (2006.01) |
| *G05D 1/00* | (2006.01) |
| *G01S 17/08* | (2006.01) |
| *G06K 9/00* | (2006.01) |
| *G01C 21/36* | (2006.01) |
| *G01S 7/497* | (2006.01) |
| *G01S 19/03* | (2010.01) |
| *G06K 7/10* | (2006.01) |
| *G06K 9/20* | (2006.01) |
| *G06T 17/05* | (2011.01) |
| *G06T 7/20* | (2017.01) |
| *G01C 3/08* | (2006.01) |
| *G01S 17/42* | (2006.01) |
| *G01S 17/89* | (2020.01) |
| *G06K 9/62* | (2006.01) |
| *G06T 15/00* | (2011.01) |
| *G01C 21/26* | (2006.01) |

(52) U.S. Cl.
CPC ............ *G01S 7/497* (2013.01); *G01S 17/42* (2013.01); *G01S 17/86* (2020.01); *G01S 17/89* (2013.01); *G01S 17/931* (2020.01); *G01S 19/03* (2013.01); *G05D 1/0088* (2013.01); *G06K 7/10217* (2013.01); *G06K 7/10584* (2013.01); *G06K 9/00201* (2013.01); *G06K 9/00791* (2013.01); *G06K 9/00805* (2013.01); *G06K 9/00825* (2013.01); *G06K 9/2027* (2013.01); *G06K 9/6202* (2013.01); *G06K 9/6215* (2013.01); *G06K 9/6267* (2013.01); *G06T 7/20* (2013.01); *G06T 15/00* (2013.01); *G06T 17/05* (2013.01); *G01C 21/26* (2013.01); *G05D 2201/0213* (2013.01); *G06T 2200/04* (2013.01); *G06T 2207/10012* (2013.01); *G06T 2207/10052* (2013.01); *G06T 2207/30236* (2013.01); *G06T 2207/30261* (2013.01); *Y10S 901/01* (2013.01)

(58) Field of Classification Search
CPC ............ G01C 21/3602; G05D 1/0088; G06K 9/00201; G06K 9/00791; G06K 9/00805; G06K 9/00825; G06K 9/6202; G06K 9/6215; G06K 9/6267; G06T 7/20; G06T 15/00
USPC ................ 348/119, 113, 118, 148; 382/104
See application file for complete search history.

(56) References Cited

U.S. PATENT DOCUMENTS

| | | | |
|---|---|---|---|
| 5,745,806 A | 4/1998 | Saito | |
| 5,831,717 A | 11/1998 | Ikebuchi | |
| 5,870,178 A | 2/1999 | Egawa | |
| 5,896,103 A | 4/1999 | Bunch | |
| 5,923,417 A | 7/1999 | Leis | |
| 6,115,114 A | 9/2000 | Berg et al. | |
| 6,323,941 B1 | 11/2001 | Evans et al. | |
| 6,502,053 B1 | 12/2002 | Hardin et al. | |
| 6,522,393 B2 | 2/2003 | Higashino | |
| 6,553,130 B1 | 4/2003 | Lemelson et al. | |
| 6,847,462 B1 | 1/2005 | Kacyra et al. | |
| 7,385,626 B2 | 6/2008 | Aggarwal et al. | |
| 7,508,496 B2 | 3/2009 | Mettenleiter et al. | |
| 7,619,754 B2 | 11/2009 | Reil et al. | |
| 7,852,461 B2 | 12/2010 | Yahav | |
| 7,957,639 B2 | 6/2011 | Lee et al. | |
| 8,125,622 B2 | 2/2012 | Gammanthaler | |
| 8,189,051 B2 | 5/2012 | Shih et al. | |
| 8,290,208 B2 | 10/2012 | Kurtz et al. | |
| 8,446,492 B2 | 5/2013 | Nakano et al. | |
| 8,547,374 B1 | 10/2013 | Sadjadi et al. | |
| 8,548,229 B2 | 10/2013 | Badino et al. | |
| 8,587,686 B1 | 11/2013 | Riza et al. | |
| 8,723,717 B2 | 5/2014 | Saito | |
| 8,736,818 B2* | 5/2014 | Weimer | G01S 7/4868 356/4.07 |
| 8,761,594 B1 | 6/2014 | Gross et al. | |
| 8,791,851 B2 | 7/2014 | Elad et al. | |
| 8,996,224 B1 | 3/2015 | Herbach | |
| 9,063,549 B1* | 6/2015 | Pennecot | G01S 17/86 |
| 9,164,511 B1* | 10/2015 | Ferguson | G01S 13/02 |
| 9,188,980 B2 | 11/2015 | Anderson | |
| 9,774,789 B2 | 9/2017 | Ciurea | |
| 10,412,368 B2 | 9/2019 | Osterwood | |
| 10,832,438 B2* | 11/2020 | Gozu | G06T 7/73 |
| 11,061,406 B2* | 7/2021 | Mao | G01S 7/4802 |
| 11,087,494 B1* | 8/2021 | Srinivasan | G01S 17/89 |
| 2001/0045981 A1 | 11/2001 | Gloger et al. | |
| 2002/0097995 A1 | 7/2002 | Nakata | |
| 2005/0200832 A1 | 9/2005 | Kawai et al. | |
| 2006/0274918 A1 | 12/2006 | Amantea et al. | |
| 2007/0165967 A1 | 7/2007 | Ando | |
| 2007/0189455 A1 | 8/2007 | Allison | |
| 2008/0199165 A1 | 8/2008 | Ng et al. | |
| 2009/0109082 A1 | 4/2009 | Rose | |
| 2010/0014781 A1 | 1/2010 | Liu et al. | |
| 2010/0040285 A1 | 2/2010 | Csurka et al. | |
| 2010/0157280 A1* | 6/2010 | Kusevic | G01S 7/4972 356/4.01 |
| 2010/0191117 A1 | 7/2010 | Kabakov | |
| 2010/0235129 A1* | 9/2010 | Sharma | G01S 7/4972 702/97 |
| 2010/0245535 A1 | 9/2010 | Mauchly | |
| 2010/0315618 A1 | 12/2010 | Hertzman | |
| 2011/0026007 A1* | 2/2011 | Gammenthaler | G01S 17/42 356/28 |
| 2011/0081043 A1 | 4/2011 | Sabol | |
| 2011/0141306 A1 | 6/2011 | Nakano et al. | |
| 2011/0292406 A1 | 12/2011 | Hollenbeck et al. | |
| 2012/0021595 A1 | 1/2012 | Kim | |
| 2012/0026510 A1 | 2/2012 | Crampton et al. | |
| 2012/0044093 A1 | 2/2012 | Pala | |
| 2012/0044476 A1 | 2/2012 | Earhart et al. | |
| 2012/0148100 A1 | 6/2012 | Kotake et al. | |
| 2012/0214037 A1 | 12/2012 | Nehmadi | |
| 2012/0326959 A1 | 12/2012 | Murthi et al. | |
| 2013/0050430 A1 | 2/2013 | Lee | |
| 2013/0107065 A1 | 5/2013 | Venkatraman et al. | |
| 2013/0174102 A1 | 7/2013 | Leu | |
| 2014/0077988 A1 | 3/2014 | Saito | |
| 2014/0078263 A1 | 3/2014 | Kim | |
| 2014/0094307 A1 | 4/2014 | Doolittle et al. | |
| 2014/0132722 A1 | 5/2014 | Bauza et al. | |
| 2014/0139639 A1 | 5/2014 | Wagner et al. | |
| 2014/0240464 A1 | 8/2014 | Lee | |
| 2014/0267631 A1 | 9/2014 | Powers | |
| 2015/0071541 A1 | 3/2015 | Qutub et al. | |
| 2015/0310273 A1 | 10/2015 | Shreve | |
| 2015/0340875 A1 | 11/2015 | Prasad et al. | |
| 2015/0356357 A1 | 12/2015 | McManus et al. | |
| 2015/0379766 A1* | 12/2015 | Newman | G06T 7/246 356/5.01 |
| 2016/0018526 A1 | 1/2016 | Van Den Bossche | |
| 2016/0047903 A1 | 2/2016 | Dussan | |
| 2016/0104289 A1* | 4/2016 | Chang | G05D 1/0274 382/154 |
| 2016/0180530 A1* | 6/2016 | Friend | G01S 17/89 382/103 |
| 2016/0295196 A1* | 10/2016 | Finn | B66B 3/02 |

(56) References Cited

U.S. PATENT DOCUMENTS

FOREIGN PATENT DOCUMENTS

| EP | 2204670 | 6/2014 |
|----|---------|--------|
| WO | WO2000012960 | 3/2000 |
| WO | WO2008070319 | 6/2008 |

OTHER PUBLICATIONS

International Search Report and Written Opinion for PCT/US2016/025252, Moscow, Russia, dated Aug. 11, 2016.

* cited by examiner

APPARATUS FOR ACQUIRING 3-DIMENSIONAL MAPS OF A SCENE

CROSS-REFERENCE TO RELATED APPLICATIONS

This application is a continuation application of and claims priority to U.S. application Ser. No. 15/087,186, filed on Mar. 31, 2016, which claims the benefit of U.S. Provisional Application No. 62/141,296, filed on Apr. 1, 2015, and U.S. Provisional Application No. 62/160,988, filed on May 13, 2015. The contents of each of these applications are hereby incorporated by reference.

BACKGROUND

An autonomous car (also known as a driverless car, a self-driving car, or a robotic car) is a vehicle that navigates without human control. An autonomous vehicle senses its environment to detect surroundings using, e.g., radar, Lidar, GPS, Odometer, or computer vision. Advanced control systems interpret sensory information to identify appropriate navigation paths, as well as obstacles and relevant signage. Autonomous cars are equipped with control systems for analyzing sensory data in order to distinguish between different cars or obstacles on the road, Currently, driverless technology is developed by Google®, Tesla®, and some other vehicles manufactures, such as Audi®, BMW®, Nissan®, and the like.

Other companies such as, e.g., Mobileye®, are in the marketplace trying to provide solutions for hands-free driving technology. Use of this technology is typically limited to particular driving infrastructures such as, e.g., highways or country roads, and usually only occurs when traffic is not congested. The corner-stone of such hands-free driving and autonomous vehicles technologies is the rendering or generation of a 3-dimensional (3D) map of a scene at any given moment during or immediately prior to motion. Such a map tries to mimic a scene as would have been seen by a driver.

The rendering of such 3D-maps is typically accomplished by measuring distances from many points in the 3D space to determine the existence of objects and their respective distances from the vehicle. The rendered 3D-maps may be combined and processed to produce driving decisions by the vehicle. Existing solutions for rendering detailed 3D-maps are based on LiDar (or LADAR) systems. A LiDar system measures distance to an object by illuminating a target (i.e., a point in space) with multiple laser beams. Such existing solutions configure the LiDar system to scan the entire scene. Rendering a single 3D-map therefore requires a large number of laser measurements.

Figure 1:
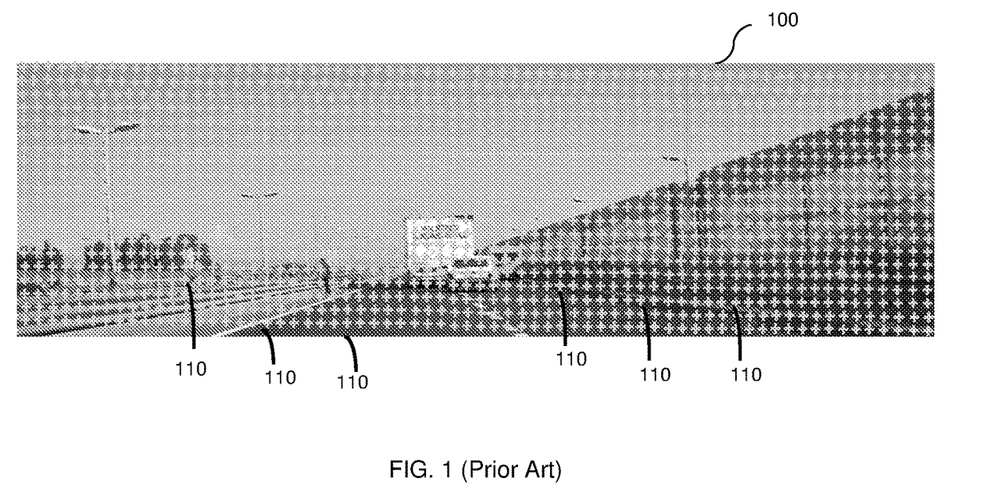
FIG. 1 is a picture of a scene for which a 3D-map is generated using a conventional approach.

For example, FIG. 1 shows an image 100 of a scene for which a 3D-map is generated. Some existing solutions implemented by hands-free and autonomous driving technologies measure the distance to each point 110 in the image 100. Thus, a laser beam illuminates each such point 110 to render the 3D-map. In many instances, the LiDar system does not have any prior knowledge of the scene, e.g., a picture of the scene. To this aim, such technologies are based on very complex and expensive equipment. For example, a robotic car made by Google® includes equipment worth about $150,000 including a $70,000 LiDar system. The LiDar system includes a 64-beam laser. Due in part to the high cost of the hardware for rendering 3D-maps, mass production of autonomous vehicles is not feasible. It should be noted that only a few points 110 are specifically labeled in FIG. 1 merely for simplicity purposes.

In addition, widespread production of the autonomous vehicle using existing Lidar systems would create hazardous conditions to pedestrians, drivers, and/or passengers because of the high number of laser beams that would be transmitted from each vehicle and would likely hit a person in the line of sight. Further, the existing LiDar solutions are typically configured to transmit all laser beams at the highest available energy. This is performed to measure a point at a maximum range of the LiDar system.

Other disadvantages of existing scanning systems (e.g., LiDar-based systems) is that they are usually based on moving parts, such as motors, to allow fast scanning by directing the multiple laser beams at different direction. Such moving parts are expensive and prone to failure. In addition, the resolution of scanning systems is unified as the entire scene is scanned. There is no granularity for scanning one area at a different (e.g., higher) resolution then another area.

Moreover, the generation of 3D-maps by scanning the entire scene tends to increase the crosstalk. This is due to the high number of laser beams being transmitted by autonomous vehicles equipped with such scanning systems. As a result, the resulting resolution of 3D-maps generated by scanning the entire scene may be limited.

It would therefore be advantageous to provide a solution for generating 3D-maps that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include an active sensor for performing active measurements of a scene. The scene may be a field of view captured by an apparatus for causing generation of the 3D-map. The active sensor comprises at least one transmitter configured to emit light pulses toward at least one target object in the scene, wherein the at least one target object is recognized in an image acquired by a passive sensor; at least one receiver configured to detect light pulses reflected from the at least one target object; a controller configured to control an energy level, a direction, and a timing of each light pulse emitted by the transmitter, wherein the controller is further configured to control at least the direction for detecting each of the reflected light pulses; and a distance measurement circuit configured to measure a distance to each of the at least one target object based on the emitted light pulses and the detected light pulses.

Certain embodiments disclosed herein also include a method for performing active measurements of a scene. The method comprises receiving an identification of at least one target object recognized in an image acquired by a passive sensor; receiving a current location of the at least one target object; determining an energy level, a direction, and a timing of a light pulse to be transmitted to each of the at least one target object; setting a transmitter with the determined energy level, direction, and timing for emitting each light pulse; setting a receiver to receive each light pulse reflected from the at least one target object at the determined at least one direction; and measuring a distance to each of the at least one target object based on the corresponding emitted light pulse and the corresponding detected light pulse.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through the several views.

According to the disclosed embodiments, 3D-maps are rendered or otherwise generated based on active measurements, passive measurements, and/or analysis of information related to such measurements. Active measurements may be laser measurements, while passive measurements may be achieved by image processing. Therefore, the disclosed embodiments allow for provision of a complete 3D-map of a scene while using a small number of low-energy laser beams. The scene includes various objects (e.g., people, inanimate objects, vehicles, animals, and the like) that can be represented by a 3D map. The scene may be limited in size or otherwise limited in scope. As an example, a scene may include all objects within 20 feet of a particular point in space. In certain configurations, the disclosed embodiments can be utilized to generate a high-resolution 3D-map of certain sections of a scene without performing active measurements for the entire scene. The utilization of a few active measurements reduces the risk of human exposure to laser beams.

Figure 2:
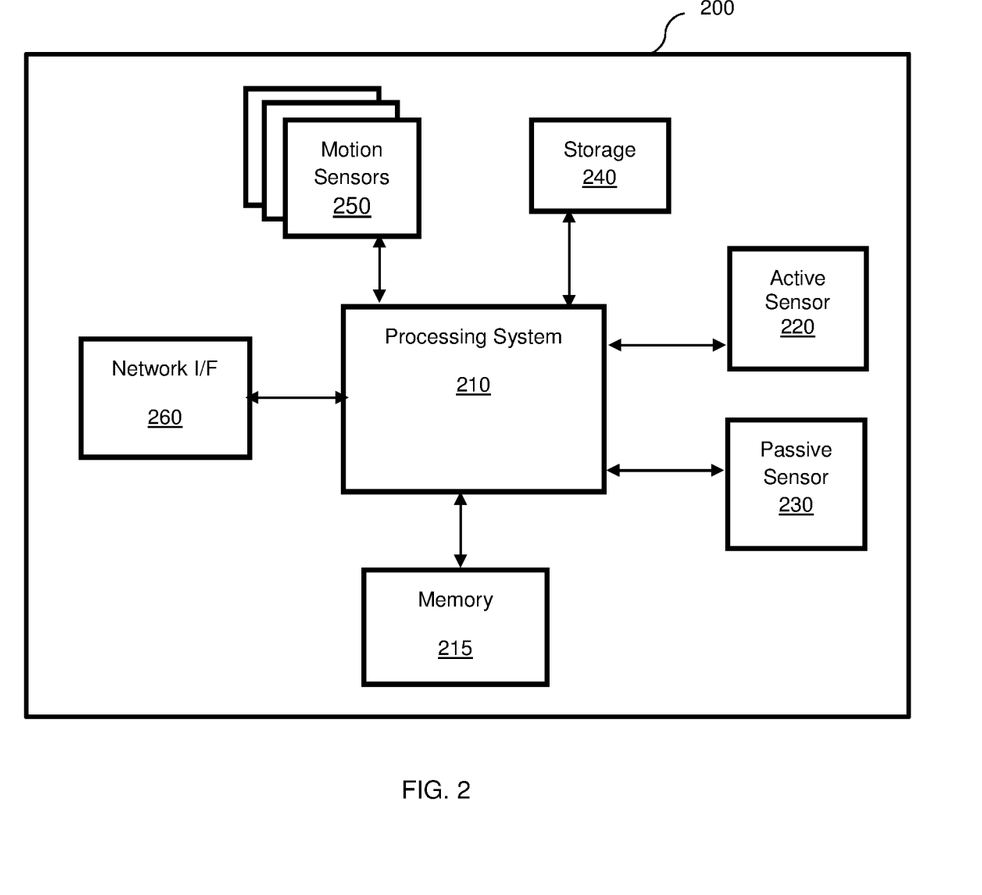
FIG. 2 is a block diagram of an apparatus configured to generate 3D-maps from a vehicle according to one embodiment.

FIG. 2 shows an example block diagram of an apparatus 200 configured to generate 3D-maps from a vehicle according to one embodiment. The apparatus 200 includes a memory 215, an active sensor 220, and a passive sensor 230 connected to the processing system 210. In certain configurations, the apparatus 200 further includes a storage 240, one or more motion sensors 250, and a network interface (I/F) 260 connected to the processing system 210.

The apparatus 200 can be, e.g., mounted on or integrated in a vehicle. Such a vehicle may include, for example, a car, a truck, a bus, a drone, a robot, and the like. The apparatus 200 can be utilized to generate 3D-maps of the scene as would be observed by an operator (e.g., a driver) of the vehicle. In an embodiment, the apparatus 200 is configured to control part or all of the operation of the vehicle based on analysis of the generated 3D-maps. Therefore, the apparatus 200 can be utilized in applications related to autonomous vehicles, hands-free driving systems, driver assistance systems, and the like.

The passive sensor 230 may be an image sensor (e.g., a camera) configured to passively acquire images. The acquired images can be processed by the processing system 210 or by the passive sensor 230 using image processing techniques.

The active sensor 220 is configured to perform active measurements in specific directions to determine the distance from objects in the scene. In an embodiment, the active measurements are laser measurements. In a further embodiment, the active sensor 220 is configured to illuminate light beams in specific directions (determined by, e.g., the processing system 210) and to detect the light beams reflected off of objects in the scene. The distance from an object can be computed based on the energy and reflection angle of each reflected light beam. The active sensor 220 can be realized as, for example, an active stereovision, a structured light, a time-of-flight (TOF), and the like. A detailed discussion of the active sensor 220 is provided below.

In an embodiment, the active sensor 220 is synchronized with the passive sensor 230 in such a way that, for each new frame (of an image acquired by the passive sensor 230), the active sensor 220 is triggered to start scanning the frame. In another embodiment, the active sensor 220 and the passive sensor 230 have the same resolution.

In order to provide an accurate operation for the active sensor 220 and the passive sensor 230, a calibration process may be performed. The calibration process allows for accurate mapping of pixels in images acquired by the passive sensor 230 to pixels scanned by the active sensor 220, and vice versa.

In an embodiment, the calibration process includes causing the active sensor 220 to scan, via light beams, a portion of a scene in different directions to build a 3D image. The scanning laser beams are detected by the active sensor 220 and by the passive sensor 230, and can be utilized to create a 3D map for each of the sensors 220 and 230. The generated maps are compared to each other to calibrate one sensor respective of the other.

The processing system 210 may be configured to process data (e.g., energy level, direction, reflection angle of the emitted and reflected beams, and so on) in order to generate a 3D-map of the entire scene or of certain objects in the scene. As will be discussed below, the number of measurements captured by the active sensor may be limited to certain points and/or surfaces in space as the initial scanning is performed using any images acquired by the passive sensors 230. In an embodiment, to create the 3D-map, additional information such as, but not limited to, previously acquired images or previously generated 3D-maps, previously determined active measurements, and/or sensory information gathered from the motion sensors 250 may be utilized. The motion sensors 250 may include, but are not limited to, a global positioning system (GPS), an accelerometer, a proximity sensor, an odometer, and the like. The additional information together with the active and passive measurements can be utilized by the processing system 210 to determine a size of each object, its speed, and/or its direction relative to the vehicle.

According to certain embodiments, the processing system 210 is configured to generate 3D maps. To this end, the processing system 210 may be configured to fuse active and passive measurements; to determine stationary or nearly stationary objects; to actively measure distances only from moving objects; and/or to estimate distances from objects using the top possible velocity of objects and/or using passive measurements.

The fusion of active and passive measurements may include, but is not limited to, utilizing the active sensor 220 to measure objects in areas were the passive sensor 230 does not provide a reliable measurement. In an embodiment, if a reliable passive measurement can be achieved, the active sensor 220 is not utilized. Thus, the disclosed embodiments may significantly reduce the number of active measurements performed by the active sensor 220.

As such, fewer laser beams or other sources may be utilized, thereby reducing energy consumption, crosstalk, and hazardous conditions, as well as achieving higher resolution. In an embodiment, the apparatus 200 can be configured such that only suspicious objects will be actively measured using the active sensor 220. A suspicious object may be any object that requires active measurement to accurately generate a map based thereon. An object may be suspicious if, e.g., the object belongs to a predetermined list of suspicious objects. Determining whether an object is suspicious may further include image-based analysis of the object to identify a type of the object (e.g., tree, human, animal, vehicles, and the like). As an example, if the apparatus 200 is mounted on a car, pedestrians in the foreground of captured images will be considered as suspicious objects while trees in the background of captured images are not. The classification of objects as suspicious is discussed further herein below.

In an embodiment, the processing system 210 is configured to determine which objects are stationary or near stationary based on images provided by the passive sensor 230. For example, using image recognition, the processing system 210 may be configured to determine stationary objects such as, e.g., a house, a tree, a pole, etc. In a further embodiment, when the passive sensor 230 is fixed (i.e., not moving), the processing system 210 may be configured to determine if an object is stationary by comparing two consecutive images and determining which objects have been moved relative to stationary objects based on the comparison. As an example, if the passive sensor is fixed to the side of a building in a scene, consecutive images may be compared to determine whether any objects in the scene have been moved relative to stationary objects. In an embodiment, when the passive sensor 230 is in motion, the distance from stationary objects can be measured using, e.g., GPS coordinates. As an example, if the passive sensor is attached to a car, the distance from stationary objects may be measured using GPS measurements and the speed of the car. This may further require processing the consecutive images acquired by the passive sensor 230.

In yet a further embodiment, determining whether objects are stationary may be based on comparisons of frames (e.g., images) captured by the passive sensor 230. The comparisons may include, but are not limited to, determining changes in distances between sets of points in the frames. In an example embodiment, each distance change between two points may be equal to a difference between the 3D distance between the points as seen in a first frame with the 3D distance between the points as seen in a second frame. Any object that is determined to have moved may be associated with a non-stationary object. In an embodiment, an object may be determined to have moved if, for example, a sum of all distance changes related to the object is above a predefined threshold. In another embodiment, an object may be determined to have moved if the sum of distance changes related to the point is greater than the sum of distance changes related to each of the other objects above a predefined threshold. In yet another embodiment, an object may be determined to have moved if a distance change related to an object in a subsequent frame is greater than a distance change related to the object in a prior frame above a predefined threshold.

In another embodiment, determining whether objects in images are stationary may be based on predicted locations of objects in an image. A prediction image may be generated based on a frame of a currently acquired image or generated 3D-map. The prediction image may be further based on a movement of the sensor acquiring the current image or providing information used to generate the current 3D-map, Based on the current frame and/or any new position or orientation of the sensor, a prediction frame illustrating predicted positions of the objects at a subsequent time (assuming the objects do not move) is generated. The prediction frame may be compared to a subsequent frame based on sensor readings at the subsequent time to determine if there are any differences between locations of the objects. In an embodiment, if a difference in location of an object between the prediction frame and a corresponding subsequent frame is above a predefined threshold, it may be determined that the object has moved.

In an embodiment, when the passive sensor 230 is in motion, the distance from stationary objects can be measured using GPS and the speed of the car. In another embodiment, the distance from stationary objects can be measured without using GPS by comparing frames (e.g., acquired images) of passive sensor information and/or 30 mapping information. In a further embodiment, finding the distance and/or angle change between any two frames may be determined, for each pair of corresponding points in the frames, based on a weighted score. To this end, in an embodiment, finding the distance or angle change between two frames may further include determining matching or otherwise corresponding points in the frames. In yet a further embodiment, the weighted score may be based on, but not limited to, a degree of error associated with the distance of the point in each frame such as, e.g., error based on noise.

In a further embodiment, a prediction frame may be generated based on 2D or 3D mapping information as well as a location and orientation of a sensor. The prediction frame may be a 3D image illustrating predicted positions of stationary (i.e., non-moving) objects included in the 3D-mapping information. Such stationary objects may include, but are not limited to, trees, billboards, signs, buildings, and other permanent or semi-permanent items or fixtures. The prediction frame may be utilized to, e.g., fill in exposed gaps of a previous frame (for example, when an object moves, the prediction frame may be utilized to illustrate a prediction for items behind the previous location of the moved object).

In another embodiment, the passive measurements may be performed based on movements of objects classified as non-stationary and non-suspicious. To this end, passively measuring the distance may include, but is not limited to, determining a boundary speed of the object and a direction of movement of the object. The boundary speed is a speed at which the boundary (i.e., outer surface) of the object is traveling. Based on the determined boundary speed and direction, a distance to the object may be estimated. In an embodiment, the estimated distance may be further based on a previously known distance to the object and/or previously generated 3D-maps including the object.

In an embodiment, the processing system 210 is configured to estimate the distance of the apparatus 200 and/or the vehicle from non-stationary objects using a maximum and/or minimum possible speed of such objects. For example, if a distance from a pedestrian is initially measured, then a range (e.g., between 0 and 2 meters) representing potential distances of the pedestrian from the apparatus 200 at a given time after the initial measurement can be determined based on a predetermined maximum velocity of a person (e.g., 2 meters per second).

In an embodiment, the processing system 210 will not trigger another active measurement with respect to an object if the object is located within a range that does not require any action (e.g., when a pedestrian is walking in a sidewalk 100 feet across the street from the apparatus 200). Whether an action is required may be based on a safe distance threshold. The safe distance threshold may include, but is not limited to, the speed of the vehicle and/or object, the distance of the object from the apparatus 200, the direction of the object relative to the apparatus 220, a type of the object, combinations thereof, and the like. In a further embodiment, active measurements may be performed when an estimated distance for a moving object (e.g., based on a boundary speed and a direction of the object) does not meet a safe distance threshold. An action may include, for example, controlling a hands free or autonomous vehicle.

In an embodiment, the processing system 210 is configured to estimate the distance of the apparatus 200 from non-stationary and stationary objects using passive measurements. Specifically, the distance may be estimated based in part on the object's approximate size and the amount of pixels the object occupies in an image acquired by the passive sensor 230. Such an estimation may further include determining if the object is in close-proximity to the apparatus 200 or not. In an embodiment, for some objects that are not in close-proximity, no active measurement by the active sensor 220 is required. The close-proximity can be determined based on a predefined threshold (e.g., a distance of under 100 meters may be determined to be in close-proximity).

Consideration of particular (e.g., suspicious) objects allows for reducing the number of active measurements by the active sensor 220.

Figure 3A:
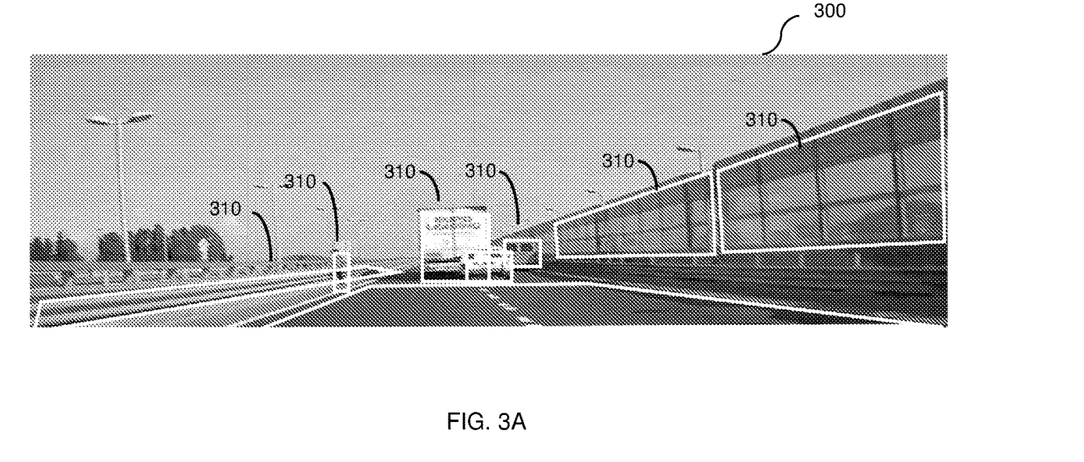
FIGS. 3A and 3B showing identification of objects in an image according to an embodiment.
Figure 3B:
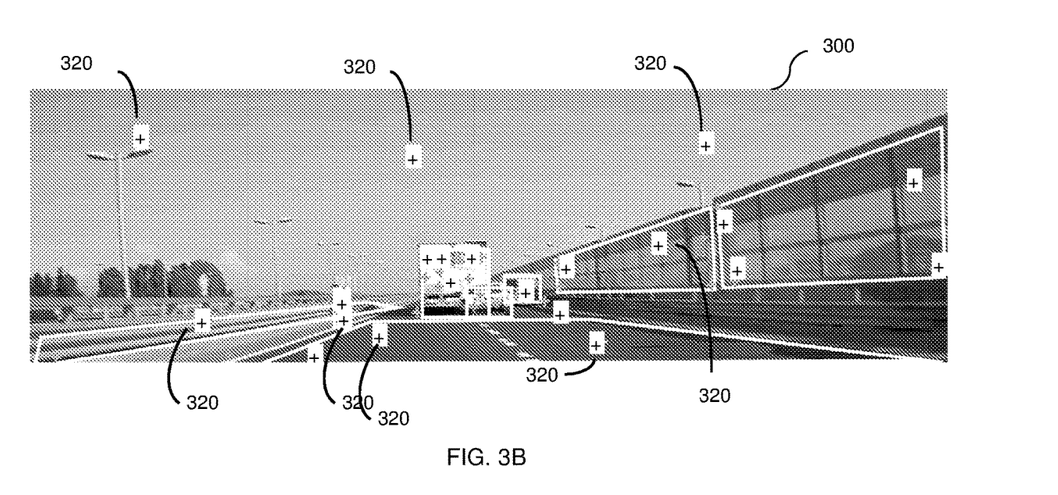

Further consideration of objects is demonstrated in reference to FIGS. 3A and 3B, each showing an example image of a scene for which a 3D-map is generated according to the disclosed embodiments. As an example, an image 300 of the scene is acquired by the passive sensor 230. The image 300 may be segmented to identify objects 310. The segmentation and identification of objects can be performed using conventional image processing techniques. For example, the road, pedestrian, car, van, track, crash barrier, and noise barrier may be identified as the objects 310. Then, object classification and passive measurements are performed. Based on the object classification, it is determined which active measurements should be made, that is, where to direct the laser beams emitted by the active sensor 220. The classification of objects may include, but is not limited to, determining whether objects in a scene are stationary, non-stationary, and/or suspicious. For example, the pedestrian, the car, the van, and the track may be classified as non-stationary and suspicious objects and, as such, active measurements in many different directions are triggered at locations 320 (shown in FIG. 3B) based, in part, on the object classification. The road, crash barrier, sky, road, and sound barrier wall may be classified as stationary and non-suspicious objects and, accordingly, fewer active measurements are performed.

As demonstrated by FIG. 3B, only a portion of the scene acquired in the image 300 is scanned with the active sensor 220. The locations for active measurements are labeled as 320. Performing a greater number of active measurements on a limited number of objects allows for providing a higher resolution with respect to these objects. This further enables providing higher resolution in certain areas where detail recognition is required.

It should be noted that FIGS. 3A and 3B are merely examples and do not limit the various disclosed embodiments. In particular, more, fewer, or different objects 310 and/or locations 320 may be identified for images without departing from the scope of the disclosure.

Once all measurements are completed, a 3D-map of the scene may be generated. Specifically, the 3D-map is generated by computing the distance of the apparatus from any pixel in the acquired image. That is, in an embodiment, generating the 3D-map may include associating each pixel with a distance value. The distance values may be derived from the passive measurements and/or active measurements. In an embodiment, only a limited set of distance measurements are performed (e.g., fewer measurements than the number of pixels). The distance values can be computed or extrapolated using a plane equation or other equivalent techniques.

Returning to FIG. 2, the processing system 210 may comprise or be a component of a processor (not shown) or an array of processors coupled to the memory 215. The memory 215 contains instructions that can be executed by the processing system 210. The instructions, when executed by the processing system 210, cause the processing system 215 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system 210 may also include machine-readable media for storing software, Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The storage 240 may be magnetic storage, optical storage, and the like, and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

In one configuration, computer readable instructions for implementing any of the embodiments disclosed herein may be stored in the storage 240. The storage 240 may also store other computer readable instructions to implement an operating system, an application program, and the like. Computer readable instructions may be loaded in the memory 215 for execution by the processing system 210. The storage 240 may also be configured to store, for example, images, generated 3D-maps, 3D or 2D maps provided by mapping services (e.g., street-level maps), and the like.

The network interface 260 may allow the apparatus 200 to communicate with other apparatuses such as, but not limited to, a controller of the vehicle (not shown), a central controller (not shown), and a cloud storage device (not shown). For example, the network interface 260 may be configured to allow the apparatus 200 to communicate with the controller of the vehicle to provide operating instructions (e.g., stop, turn right, etc.) over a network (not shown). In an embodiment, the network interface 260 allows remote access to the apparatus 200 for the purpose of, for example, configuration, loading of new maps, and so on. The network interface 260 may include a wired connection or a wireless connection. The network interface 260 may transmit and/or receive communication media. For example, the network interface 260 may include a modem, a network interface card (NIC), an integrated network interface, a radio frequency transmitter/receiver, an infrared port, a USB connection, and the like.

Figure 4:
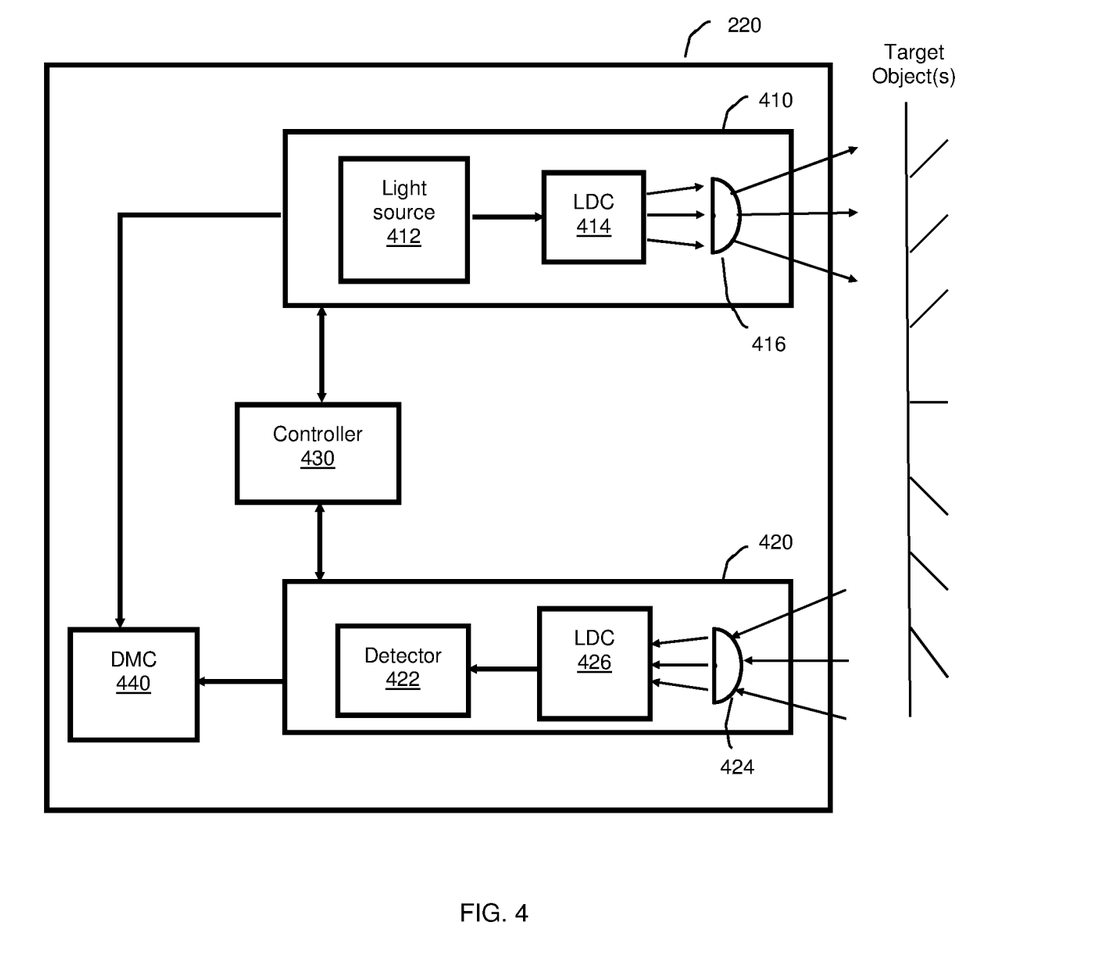
FIG. 4 is a block diagram of the active sensor arranged according to one embodiment.

FIG. 4 is an example block diagram of the active sensor 220 arranged according to one embodiment. The active sensor 220 includes a transmitter (TX) 410 and a receiver 420 connected to a controller 430. In an optional configuration, the active sensor 220 also includes a distance measurement circuit (DMC) 440. In one embodiment, the controller 430 may be realized as the processing system 210. In another embodiment, the controller 430 is a separate element from the processing system 210 and can be realized as, but not limited to, general-purpose microprocessors, multi-core processors, microcontrollers, DSPs, FPGAs, PLDs, controllers, state machines, gated logic, discrete hardware components, dedicated hardware finite state machines, or any other suitable entities that can perform calculations or other manipulations of information. It should be noted that, in certain configurations, the active sensor 220 may include a plurality of transmitters 410 and/or a plurality of receivers 420.

In an embodiment, the transmitter 410 is configured to emit or transmit light pulses (e.g., laser beams) at varying energy levels and at different directions. The energy level, direction, and timing of each light pulse may be determined by the controller 430. Multiple light pulses can be sent at different directions at roughly the same time. The energy levels of such light pulses may be the same or different.

As noted above, the active sensor 220 and/or a target object may be in motion when the active measurements are performed. A measurement to a specific point (a pixel in an identified object) is determined respective of the analysis of the image captured by the passive sensor. The location of such point is likely to be moved from when the image is captured and processed until the active measurement is triggered (i.e., a light pulse is emitted), To compensate for such a difference, the new location of the point is estimated. To this end, the timing, direction and/or energy level of the light pulse may be determined, with the estimated new location based on the determined timing, direction, and/or energy level.

The new location of the point to direct the active measurement to can be estimated based on the time elapsed since the image is captured until the measurement is triggered, information provided by one or more motion sensors (e.g., accelerometer, GPS, and/or gyroscope), previously captured images, and/or previously generated 3D maps. For example, gyroscope information can be used to determine an orientation of the sensor 220 at a new location respective of the old location (i.e., the location at which the image was captured).

In an embodiment, the transmitter 410 includes a light source 412, a static light directing circuit (LDC) 414, and one or more transmit (TX) lenses 416 utilized to focus the energy of the light pulses. The light source 412 may include any device that radiates or emits electromagnetic radiation in multiple wavelengths or in a single wavelength. The light source 412 may be realized as, but not limited to, a laser, a LED, an array of LEDs, and the like.

In an embodiment, the light source 412 is configured to emit a light pulse at an energy level determined based on the maximum distance to an object that the pulse is directed to. The energy level may be controlled by the controller 430.

The static LDC 414 is configured to direct the light pulse emitted by the light source 412 in a particular direction. The static LDC 414 can be implemented without any moving parts. In one embodiment, the static LDC 414 is realized using a microelectromechanical system (MEMS) mirror or an array of MEMS mirrors. When the static LOC 414 is realized using a single MEMS mirror, the scanning may be performed along both the X and Y axes by the same mirror. Alternatively, the static LDC 414 is realized using two MEMS mirrors, each MEMS mirror be can used to scan along a different axis. In another embodiment, the static LOC 414 is realized using an acousto-optic modulator (AOM). In yet another embodiment, the static LOC 414 is realized using an electro-optic modulator (EOM). Different realizations of the static LOC 414 may require different configurations.

A MEMS mirror is an optical beam steering device. When using a MEMS mirror in the static LOC 414, a light pulse (or beam) can be steered to a specific direction and/or split into different directions. In this configuration, the MEMS mirror is horizontally placed in the LDC 414. This is further demonstrated in FIG. 5, showing the static LDC 414 constructed using a MEMS mirror 510.

Figure 5:
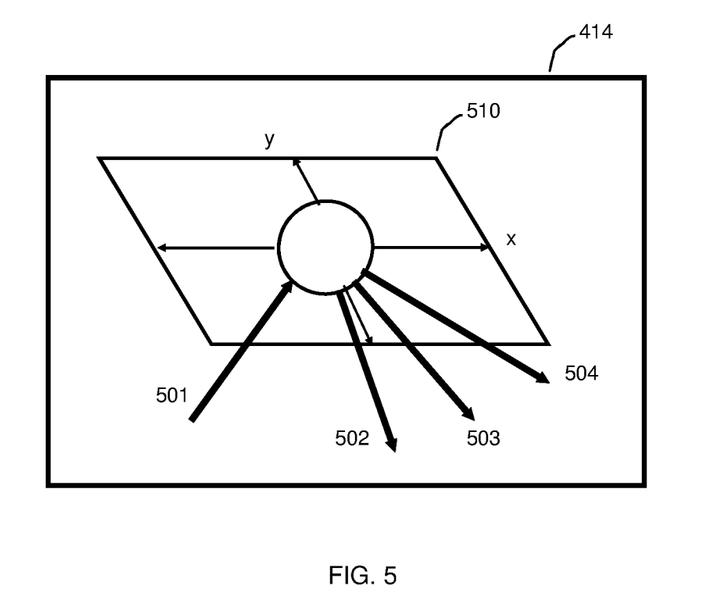
FIG. 5 is a schematic diagram of a static LDC constructed using a MEMS mirror according to an embodiment.

In this configuration, a light beam 501 hits the MEMS mirror 510 at one direction and is reflected at a different direction controlled by the controller 430 (controller 430 not shown in FIG. 5). Specifically, the MEMS mirror 510 can be tilted along the X and Y axes, where the tilting may be caused by applying an electric signal (generated by, e.g., the controller 430) along the X and Y axes. This signal causes changing of the tilt of the mirror 510 at a predefined range of spatial angles. As shown in FIG. 5, one light beam 501 can be reflected from the MEMS mirror 510 in different directions (illustrated as in FIG. 5 as example reflected beams 502, 503, and 504, respectively).

In another embodiment, a constant electric signal is applied, thereby causing the MEMS mirror 510 to tilt at a predefined range of spatial angles. In this embodiment, the transmission of the light beam is timed according to the angle that the mirror is at. This allows for transmission of the beam at a direction without causing any sudden or rapid changes and/or waiting for the MEMS mirror 510 to stabilize at the requested direction. In certain configurations, the MEMS mirror 510 can be replaced with other types of scanning mirrors.

An EOM is an optical device in which a signal-controlled element exhibiting the electro-optic effect is used to modulate and steer a light beam. An AOM is an optical device in which the acousto-optic effect is utilized to modulate and steer a light beam. An electric signal drives the transducer to vibrate, which creates sound waves in the material, thereby causing modulation in the light beam.

Figure 6:
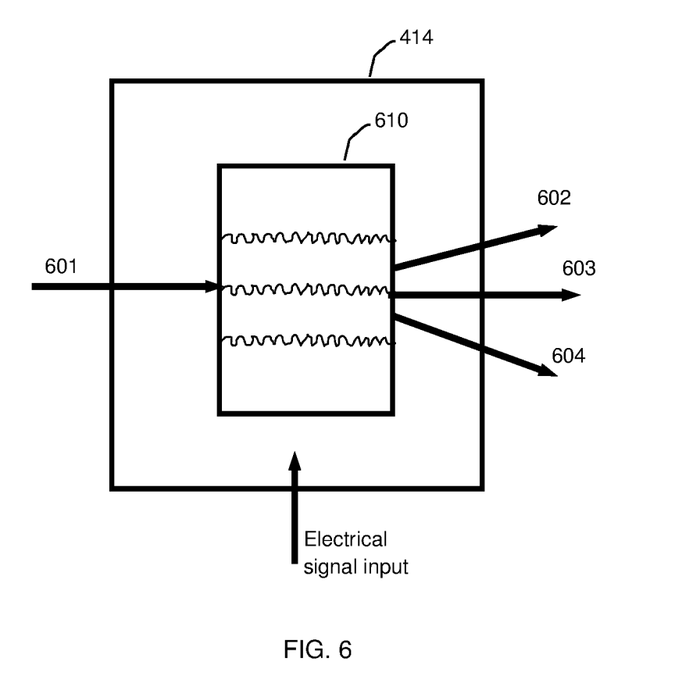
FIG. 6 is a schematic diagram of a static LDC constructed using an optical modulator according to an embodiment.

When using an AOM or EOM in the static LOC 414, a light beam (or pulse) can be steered to a specific direction and/or split into different directions. In this configuration, the AOM or EOM may be placed vertically in the LOC 414. This is further demonstrated in FIG. 6, showing the static LOC 414 constructed using an optical modulator 610. The optical modulator 610 may be an AOM or an EOM.

In this configuration, the light beam 601 hits the mirror 610 at one direction and is reflected in different directions as controlled by, e.g., the controller 430 (controller 430 not shown in FIG. 6). Specifically, the controller 430 generates an electrical signal input to the optical modulator 610, and such a signal causes the modulator 610 to steer the beam 601 in different directions. As shown in FIG. 6, one light beam 601 can be reflected from the MEMS mirror 610 in different directions (illustrated as example reflected beams 602, 603, and 604, respectively).

Using the above-mentioned configuration, the static LOC 414 can direct the light beams at multiple spatial angles. In an embodiment, the static LOC 414 is synchronized with the light source 412 so as to direct each emitted light at a different spatial angle. In another embodiment, the static LOC 414 is controlled to rapidly change between angles to perform a large number of active measurements (using the active sensor) in each frame. For example, in each frame of 30 msec, about 30,000 active measurements may be performed. The angles or directions to direct the light beam may be preordered in a specific order to achieve maximum area scanning during a predefined time interval.

In an embodiment, the lenses 416 are collimating lenses. For single and multi-mode lasers with cylindrical symmetry, the collimating lenses 416 may magnify the beam waist of the laser and may transform the laser beam angular distribution into the far field. In another embodiment, the cylindrical lenses may equalize the spread angles in both directions.

In an embodiment, the receiver 420 is configured to detect light signals reflected from a target object to allow active measurements of a distance to an object. In an embodiment, the transmitter 410 transmits light pulses that hit a target and a portion of each pulse's energy is reflected back toward the receiver 420. The reflected signals are detected and the time elapsed between emission of the respective light pulse and the detection of the returned signal is determined. In a further embodiment, the DMC 440 measures the distance to the object based on the elapsed time.

In an optional embodiment, the DMC 440 measures the distance based on the phase delay between the transmitted and reflected (received) light signals. In this embodiment, the transmitted light pulses are sinusoidally modulated at varying frequencies or at a single frequency.

In one embodiment, the receiver 420 includes a detector 422 and lenses 424. Optionally, the receiver 420 also includes a static LDC 426. The detector 422, in an embodiment, is realized as an array of photodiodes. In another configuration, the detector 422 is realized as a charge coupled device (CCD) or as one or more complementary metal oxide semiconductor (CMOS) light sensors. The configuration of the receiver 420 depends on the type of the light source.

In an embodiment, to expedite the acquisition of the active measurements, the transmitter 410 is configured to transmit multiple light pulses at different directions simultaneously, thereby allowing for measurement of different distances based on the simultaneous light pulses. To this end, the receiver 420 is configured to detect all reflected signals in parallel.

In another embodiment, the detector 422 receives light signals reflected from specific directions after hitting the target object. This allows for reduction of the crosstalk and the optical noises by filtering out signals from other directions. To this end, the static LOC 426 is controlled, by the controller 430, to direct signals reflected from specified directions to the detector 422. As noted above, a static LDC 426 can be realized as a MEMS mirror, an array of MEMS mirrors, an AOM, an EOM, and the like.

The lenses 424 may also be designed to reduce the crosstalk and to increase the signal to noise ratio (SNR). To this end, the lenses 424 are typically either infrared filters or polarized lenses. If the lenses 424 are polarized lenses, in an embodiment, the light source 412 may send polarized light. Reducing the crosstalk is important when, for example, many vehicles equipped with scanning capabilities are driving on the same road and, in particular, when those vehicles are close to each other. Increasing the SNR allows transmission of low energy light pulses and efficient detection of reflections thereof.

In an embodiment, the lenses 424 include a polarized lens which reduces optical noise and crosstalk. In a further embodiment, the lenses 416 may also include a polarizer with the same angle as the lenses 424. In an embodiment, the predefined angle is 45 degrees. In an embodiment, each active sensor 220 only detects light signals that were generated by its own transmitter 220, while signals generated by other apparatuses (installed on different vehicles) may be filtered. Therefore, the configuration of lenses 424 and 416 with polarized lenses would eliminate any light signals transmitted by other vehicles driving in, for example, the opposite direction.

The active sensor 220 discussed with reference to FIG. 4 can be implemented as a single component. The single component may be realized as a chipset, an ASIC, and the like. In another embodiment, the active sensor 220 may be implemented as a distributed component including one or more transmitters 410 and receivers 420, controlled by multiple controllers or a single centralized controller 430. Further, in such an embodiment, the same optics can be shared between the transmitter and receiver. That is, the optical signal can be received and transmitted through the same optical path.

In one distributed configuration of the active sensor 220, the transmitter or transmitters are stationary (e.g., installed on poles on the side of a road) while the receiver or receivers are non-stationary (e.g., installed on the moving vehicles). This distributed configuration is further illustrated in FIG. 7, which shows an example bird's eye view map utilized to describe an embodiment.

The transmitters 710-1 through 710-3 (hereinafter referred to individually as a transmitter 710 and collectively as transmitters 710, merely for simplicity purposes) are placed along the road at locations covering one lane and do not interfere with signals transmitted at the opposite lane. To measure a distance, for example, between cars, the times at which the light pulse was transmitted and the times at which the light pulse was received, as well as the locations of the transmitters 710 and one or more of the cars should be known. The receivers (not shown in FIG. 7) may be installed on any or all of the vehicles 720-1 through 720-6.

Figure 7:
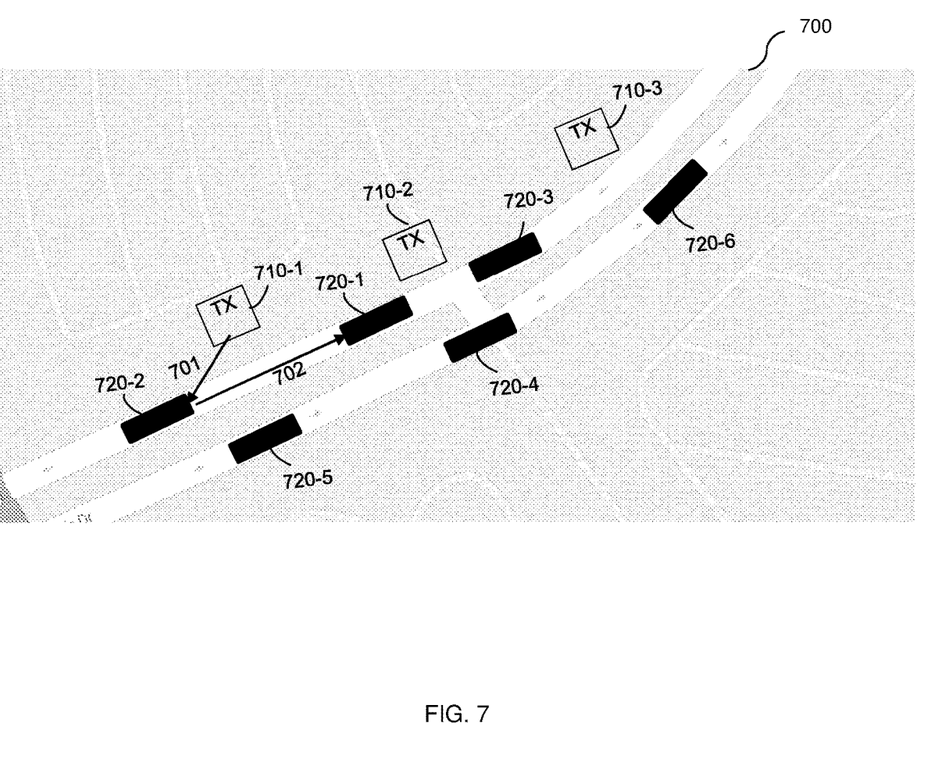
FIG. 7 illustrates the operation of a distributed optical sensor according to an embodiment.

As an example, in order to measure the distance between the vehicles 720-1 and 720-2, the locations of the transmitter 710-1 and the vehicle 720-1, the time at which the light pulse 701 was transmitted by the transmitter 710-1, and the time at which the returned signal 702 was detected by the receiver (not shown) in the vehicle 720-1 are determined. The location of the vehicle 720-1 can be provided by a GPS in the vehicle 720-1.

The light pulse 701 travels from the transmitter 710-1 to the vehicle 720-2, and is returned as a signal 702 from the vehicle 720-2 to the vehicle 720-1. Based on the location of the vehicle 720-1 and the location of the transmitter 710-1 as well as the time at which the light pulse 701 was transmitted, the distance between the vehicle 720-1 and the vehicle 720-2 can be determined, for example, by the receiver in the vehicle 720-1. The information related to time and locations can be shared using communication protocols.

In another distributed configuration of the active sensor 220, the transmitters and the receivers are non-stationary but are separated. Thus, the transmitters and receivers may be installed on, for example, different vehicles. Each transmitter is configured to cover a section of a scene (e.g., a road) and, therefore, each object in the covered section is illuminated only once by the transmitter at a point that is close to the object. Thus, the transmitted light pulses may be at a lower energy level. The measurement of the distances is performed as described further herein above with respect to the distributed configuration. The location of the transmitters, in this case, can be provided by a GPS.

Figure 8:
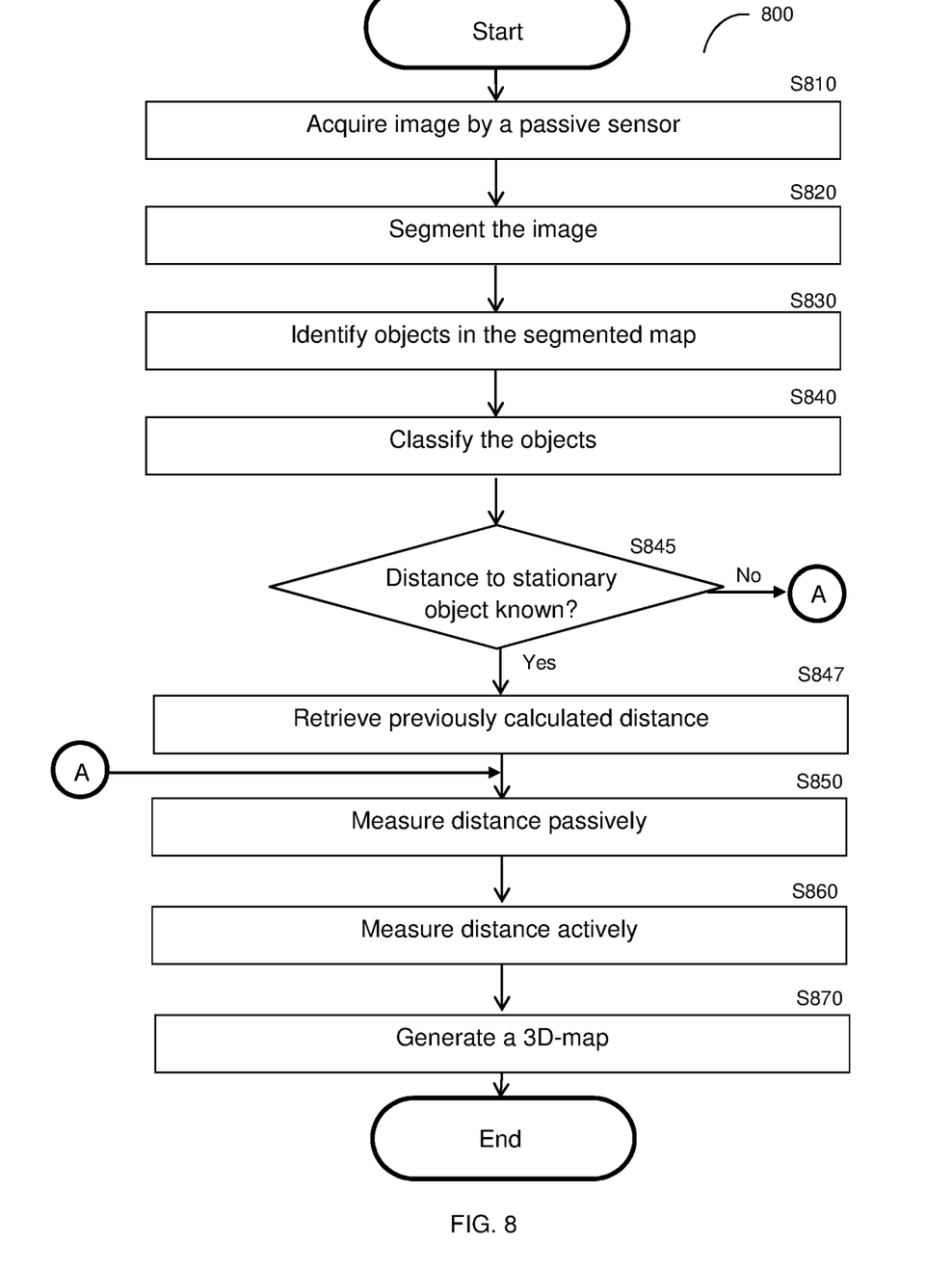
FIG. 8 is a flowchart illustrating a method for generating a 3D-map of a scene according to an embodiment.

FIG. 8 is an example flowchart 800 illustrating a method for generating 3D-maps of a scene according to an embodiment. In an embodiment, the method may be performed by an apparatus (e.g., the apparatus 200) operable in, for example, a vehicle, and the generated 3D-map may represent the scene as it would have been seen by an operator of the vehicle. The 3D-map may be generated based on a fusion of passive and active measurements.

At S810, one or more images is acquired by a passive sensor. In an embodiment, the acquired images are saved in a memory according to their acquisition order. In another embodiment, the acquired images may include frames from a video being continually recorded.

At optional S820, each image may be segmented to generate a segmentation map. The segmentation map includes a plurality of segments, each of which features homogeneous pixels having the same color or substantially similar colors.

At S830, objects are identified hi the images and/or segmentation map. The objects may be identified based on, e.g., image recognition. It should be noted that an object can include multiple segments. For example, a track colored with two different colors can be segmented as two segments, but identified as one object.

At S840, the identified objects are classified. In an embodiment, the objects may be classified into one or more of the following categories; stationary (i.e., immobile), non-stationary (i.e. moving or likely to move), suspicious, or non-suspicious. In an embodiment, whether an object is non-stationary or stationary may be determined by identifying the object (e.g., using image recognition) and based in part or entirely on its type. For example, an object showing a building may be classified as stationary. In another embodiment, the non-stationary or stationary category of an object is determined by comparing two consecutive images taken during a predefined time interval to determine if the location of an object has changed. If the location of the object remains the same, the object is classified as stationary; otherwise, the object may be classified as non-stationary. In another embodiment, the object classification may be based on the size of the identified object. As a non-limiting example, an object having a size above a predefined threshold (e.g., an object large enough that a vehicle would need to navigate around the object) may be classified as suspicious, but an object having a size below the predefined threshold (e.g., an object small enough that the vehicle can ride over the object safely) may be classified as non-suspicious.

In an embodiment, the classification based on the image comparisons may be further based on movement (or lack thereof) and/or positioning of the passive sensor. Specifically, when the passive sensor is not in motion (for example, if the passive sensor is attached to a vehicle that is stopped at a traffic light) and the two consecutive images are taken from the same angle, the comparisons may indicate changes in the location of a moving object relative to other objects. When the passive sensor itself is in motion (for example, if the passive sensor is attached to a moving vehicle), the two consecutive images are taken from different angles. To allow an accurate comparison between the different angle images, in an embodiment, a second image (e.g., the subsequently taken image) may be transformed to match an angle of a first image (e.g., a previously taken image), thereby placing the two images at the same angle. The image transformation can be performed using a virtual camera technique. It should be noted that, in one scene, an object can be classified as stationary (e.g., a parked car), while in the next scene, the object may be classified as non-stationary (e.g., a car moving from a parking spot). In an embodiment, the classification of stationary objects can be performed based in part on 2D, 3D, street-view, and/or satellite maps provided mapping services. This allows for identification of buildings and the like based on their known locations.

In an embodiment, the classification of suspicious objects is based in part or in whole on a predetermined list of suspicious objects. For example, objects predetermined to be suspicious may be, but are not limited to, other vehicles on the road, pedestrians, animals, debris on the road, and so on. The list can be dynamically updated. Typically, objects that are in close-proximity and may pose a danger or hazard are classified as suspicious. It should be noted that a suspicious object can be classified as "suspicious and stationary" or "suspicious and non-stationary". In a further embodiment, an object may be considered to be in close-proximity when the object is within a predetermined distance (e.g., 50 meters) from a particular point or other object. As an example, for an apparatus affixed to a vehicle, an object may be in close-proximity when the object comes within 75 meters of the vehicle.

At S845, it is checked, for each object classified as stationary, if the distance to the object classified as stationary is known. If so, execution continues with S847; otherwise, execution continues with S850. At S847, the distance to the stationary object is retrieved from previous calculations. This distance information can be derived from previously generated 3D maps. A stationary object may be determined to be stationary relative to the previously generated 3D map. As an example, if a passive sensor is not moving, an object is stationary, and a previously determined passive measurement and/or active measurement distance is available for the object from that passive sensor, then the current passive measurement for the object may be determined to be the previously determined distance.

At S850, passive measurements are performed based on the acquired images. As noted above, such measurements may be performed if the information cannot be derived from previously generated 3D maps. The passive measurements may include, but are not limited to, measuring at least a distance from any or all of the classified objects. In an embodiment, the distance from each object classified as "stationary" or "non-suspicious and non-stationary" is determined via the passive measurements. The passive measurement may include determining the distance to an object in the acquired image using a known size (based on, e.g., number of pixels) of the object, a distance from a valid reference point, a vanishing point and vanishing line, a movement of an apparatus or vehicle, and so on. The distance measurements may be saved in a memory (e.g., the memory 215). It should be noted that each distance measurement may be for all or any of the pixels composing the object.

In another embodiment, the passive measurements may be performed based on movements of objects classified as non-stationary and non-suspicious. To this end, passively measuring the distance may include, but is not limited to, determining a boundary speed of the object and a direction of movement of the object. The boundary speed is a speed at which the boundary (i.e., outer surface) of the object is traveling. Based on the determined boundary speed and direction, a distance to the object may be estimated. In an embodiment, the estimated distance may be further based on a previously known distance to the object and/or previously generated 3D-maps including the object.

At S860, active measurements are performed. In an embodiment, the active measurements may be performed by using an active sensor (e.g., the active sensor 220). Performing the active measurements may include, but is not limited to, measuring a distance from any or all of the classified objects. In an embodiment, the active measurements may be performed for objects classified as "suspicious", "non-stationary", and/or "suspicious and non-stationary". In another embodiment, the distance is actively measured when a reliable passive measurement of that distance cannot be achieved. Examples where reliable passive measurements cannot be achieved include when, e.g., one or more objects and/or details in the acquired image appear several times; the image contains plain areas with no definite texture (e.g., walls and sky); details in the image are hidden in another view; and the image contains one or more noisy areas. By re-measuring such objects, the accuracy is increased, and the number of false alarms is significantly decreased.

In an embodiment, S860 includes emitting a laser beam (or a light pulse) using a laser diode. As noted above, the timing, direction and energy level for each emitted laser beam is controlled to achieve an accurate distance measurement. In an embodiment, at least the direction of the laser beam is adjusted based on the time and location difference between the time that an image was acquired by the passive sensor and when the active measurement has been triggered. This is performed in order to compensate for the movement of the active sensor and/or a target object during that time. The direction in which to point the active sensor can be estimated using accelerometer information by determining a current location of the active sensor relative to its location when the image was acquired.

The emitted laser beam hits a target and a portion of the laser's energy is reflected back toward the active sensor. The returning signal is detected and the time elapsed between emission of the light pulse from the laser and the detection of the returned signal is determined. A distance measurement of the distance to the object may be determined based on the elapsed time. It should be noted that the distance measurement may be for any or all of the pixels in images. In an embodiment, multiple active measurements may be performed per object, where at each such measurement, a laser pulse is directed at a different angle. A resolution of the measurement may be based on the number of measurements performed for each object.

It should be noted that the active measurements performed at S860 may be based on other active transmissions or emissions such as, but not limited to, radar, sound, laser triangulation, and the like. It should also be noted that S850 and S860 can be performed in parallel. For example, active measurements can be performed in parallel with passive measurements on objects classified as non-stationary and/or objects that cannot be passively measured.

In certain embodiments, the energy level of the emitted laser for each object is controlled based on the proximity of the object to the active sensor. In a further embodiment, the closer in proximity the object is to the active sensor, the lower the energy level required. The proximity can be determined using previous active and/or passive measurements in the area being scanned. By controlling the energy level, the energy consumption of the active sensor may be reduced as compared to always using laser beams having the highest possible amount of energy. Further, controlling the energy levels reduces the risk of hurting humans via the laser beams as objects that are in close proximity will be scanned with relatively low energy levels.

At S870, a 3D map is generated based on the passive and active measurements. In order to generate a 3D-map of the scene, a distance value for pixel in the acquired image should be available. In an embodiment, one or more distance values may be included in the 3D map for each segment in the segmentation map. Each distance value can be, e.g., one of the passive or active measurements. In a preferred embodiment, at least 3 distance values for at least 3 pixels of each segment should be included in the 3D map.

As noted above, a segment may be part of an object or may be the entire object. The distance values of all pixels in a segment can be computed or extrapolated based on the at least 3 distance measurements for the segment. To this end, in an embodiment, the plane equation is computed based on at least 3 distance measurements for at least 3 pixels in each segment. The computed plane equation may be utilized to determine all pixels in the same segment and/or on the same surface. It should be noted that other geometric techniques can be utilized to the compute the distance values of all pixels in a segment without departing from the scope of the disclosure. It should be further noted that, for some segments, distance values for all the pixels will be available through the active or passive measurements and, therefore, there is no need to solve the plane equation for such segments.

In another embodiment, if distance values of all of the pixels cannot be estimated based on the plane equation, more active measurements will be triggered.

In yet another embodiment, if all distance values of all pixels are available from the previous frame, a limited number of active measurements (e.g., 3 active measurements) may be performed and the distance values from the previous frames may be adjusted based on the active measurements.

The rendering of the 3D-surface of each segment causes rendering of 3D representations of the identified objects, thereby resulting in a 3D-map of the scene. The resulting 3D-map can be later utilized to, e.g., provide driving directions to a controller controlling the operation of the vehicle.

It should be noted that the embodiments disclosed herein are described with respect to particular units of measurement merely for simplicity purposes and without limitations on the disclosed embodiments. Other units of measurements may be utilized without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system, comprising:
    a. a LIDAR sensor mounted on a vehicle, including:
        i. a transmitter configured to emit light pulses toward a scene including one or more target objects,
        ii. a receiver configured to detect reflected light pulses from the one or more target objects in the scene, the LIDAR sensor configured to generate in response to the reflected light pulses a LIDAR scene representation including LIDAR data conveying a plurality of distance values,
    b. an image sensor mounted on the vehicle to generate an image scene representation including image data conveying a plurality of pixels,
    c. the LIDAR sensor and the image sensor being calibrated one respective to the other to provide a mapping between the LIDAR scene representation and the image scene representation wherein, by scanning light beams and detecting the light beams in the scene representations, distance values of the LIDAR data are mapped to corresponding pixels of the image data,
    d. a computer system receiving the LIDAR data and the image data and configured for:
        i. fusing the LIDAR scene representation and the image scene representation into a 3D scene map having a succession of frames, including:
            1. for a current frame of the 3D scene map associating first distance values from a current frame of the LIDAR data to respective first pixels in a current frame of the image data, according to the mapping,
            2. deriving distance measurements conveyed in a previous frame of the LIDAR data and associating the derived distance measurements with second pixels of in the current frame of the image data,
        ii. processing the 3D scene map to identify the one or more target objects in the scene, to derive driving directions and to provide the driving directions to a controller controlling an operation of the vehicle.

2. A system as defined in claim 1, wherein the processing of the 3D scene map to identify the one or more target objects includes classifying the one or more target objects in at least one object category among a plurality of object categories.

3. A system as defined in claim 1, wherein the image sensor has a higher resolution than the LIDAR sensor.

4. A system as defined in claim 3, wherein the transmitter has a light source comprising a laser.

5. A system as defined in claim 1, wherein the transmitter comprises a light directing circuit configured to direct the light pulses in a direction selected among a plurality of directions.

6. A system as defined in claim 5, wherein the transmitter includes a microelectromechanical system (MEMS) mirror configured to direct the light pulses in the direction selected among the plurality of directions.

7. A system as defined in claim 5, wherein the transmitter includes an electro-optic modulator (EOM) configured to direct the light pulses in the direction selected among the plurality of directions.

8. A system as defined in claim 5, wherein the light directing circuit is configured to steer the light pulses to effect a scan of at least part of the scene.

9. A system as defined in claim 1, wherein the computer system is configured to segment the image data into a plurality of segments.

10. A system as defined in claim 9, wherein the computer system is configured to define segments in the image data based at least in part on visual similarly of pixels in a segment.

11. A system as defined in claim 10, wherein a segment includes pixels having similar colors.

12. A system as defined in claim 2, wherein the plurality of object categories includes an object category associated with static objects.

13. A system as defined in claim 2, wherein the plurality of object categories includes an object category associated with moving objects.

14. A system as defined in claim 2, wherein the plurality of object categories includes a suspicious object category and a non-suspicious object category, the computer system classifying the one or more target objects in the non-suspicious objects category when a size of the one or more target objects is such that a moving vehicle on which the system is placed can ride over the one or more targets object safely.

15. A system as defined in claim 2, wherein the plurality of object categories includes a suspicious object category and a non-suspicious object category, the computer system classifying the one or more target objects in
the suspicious objects category at least in part on a distance of the one or more target objects to a vehicle on which the system is placed.

16. A system as defined in claim 2, wherein the classifying of the one or more target objects includes distinguishing between target objects representing a pedestrians and target objects representing vehicles.

17. A system as defined in claim 2, wherein the classifying of the one or more target objects includes distinguishing between target objects representing debris on the road and target objects representing vehicles on the road.

18. An automated method, comprising:
   a. providing a LIDAR sensor, including:
      i. a transmitter configured to emit light pulses toward a scene including one or more target objects,
      ii. a receiver configured to detect reflected light pulses from the one or more target objects in the scene, the LIDAR sensor configured to generate in response to the reflected light a LIDAR scene representation including LIDAR data conveying distance values,
   b. providing an image sensor to generate an image scene representation including image data conveying a plurality of pixels,
   c. calibrating the LIDAR sensor and the image sensor to provide a mapping between the LIDAR scene representation and the image scene representation wherein, by scanning light beams and detecting the light beams in the scene representations, data elements of the LIDAR data are mapped to corresponding pixels of the image data,
   d. providing a computer system receiving at an input the LIDAR data and the image data,
   e. processing with the computer system the LIDAR data and the image data to produce a 3D scene map, including:
      i. performing a data fusion operation between the LIDAR scene representation and the image scene representation to produce a 3D scene map having a succession of frames, including:
         1. for a current frame of the 3D scene map associating first distance values from a current frame of the LIDAR data to respective first pixels in a current frame of the image data according to the mapping,
         2. deriving distance measurements conveyed in a previous frame of the LIDAR data and associating the derived distance measurements with second pixels in the current frame of the image data,
      ii. processing the 3D scene map with the computer system to identify the one or more target objects in the scene, to derive driving directions and to provide the driving directions to a controller controlling an operation of a vehicle.

19. A method as defined in claim 18, wherein the processing of the 3D scene map to identify the one or more target objects includes classifying the one or more target objects in at least one object category among a plurality of object categories.

20. A method as defined in claim 18, wherein the image sensor has a higher resolution than the LIDAR sensor.

21. A method as defined in claim 20, wherein the transmitter has a light source comprising a laser.

22. A method as defined in claim 18, wherein the transmitter comprises a light directing circuit configured to direct the light pulses in a direction selected among a plurality of directions.

23. A method as defined in claim 22, wherein the transmitter includes a microelectromechanical system (MEMS) mirror configured to direct the light pulses in the direction selected among the plurality of directions.

24. A method as defined in claim 22, wherein the transmitter includes an electro-optic modulator (EOM) configured to direct the light pulses in the direction selected among the plurality of directions.

25. A method as defined in claim 22 wherein the light directing circuit is configured to steer the light pulses to effect a scan of at least part of the scene.

26. A method as defined in claim 18, wherein the computer system is configured to segment image data into a plurality of segments.

27. A method as defined in claim 18, wherein the computer system is configured to define segments in the image data based at least in part on visual similarly of pixels in a segment.

28. A method as defined in claim 27, wherein a segment includes pixels having similar colors.

29. A method as defined in claim 19, wherein the plurality of object categories includes an object category associated with static objects.

30. A method as defined in claim 19, wherein the plurality of object categories includes an object category associated with moving objects.

31. A system as defined in claim 1, wherein the computer system is further configured for estimating distance values for third pixels in the image data for which no distance values are available in the current frame of LIDAR data at least in part on the basis of distance values available for neighboring pixels that are visually similar to the third pixels.

32. A method as defined in claim 18, further comprising estimating distance values for third pixels in the image data for which no distance values are available in the current frame of LIDAR data at least in part on the basis of distance values available for neighboring pixels that are visually similar to the third pixels.

* * * * *